Figure 1:
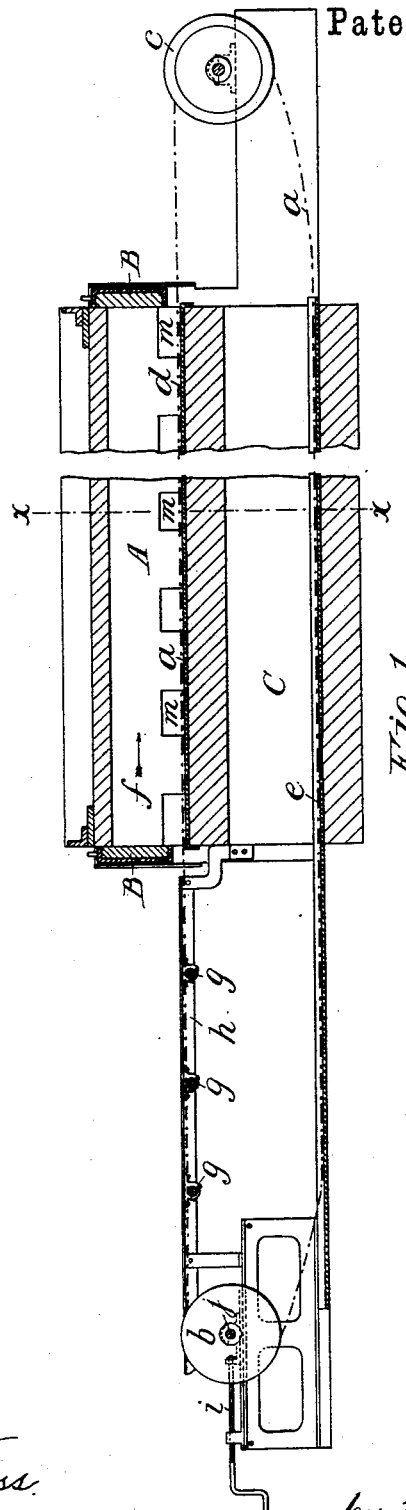

(No Model.) 5 Sheets—Sheet 1.
E. A. DAVIES & S. T. THOMAS.
APPARATUS FOR PREPARING METAL SHEETS FOR PURPOSE OF GALVANIZING OR OTHERWISE COATING THEM.

No. 580,210. Patented Apr. 6, 1897.

Witnesses:
F. W. Hinson
Peter A. Ross.

Inventors.
Edward A. Davies
Stephen T. Thomas
by Henry Connett
their Attorney (No Model.) 5 Sheets—Sheet 2.

E. A. DAVIES & S. T. THOMAS.
APPARATUS FOR PREPARING METAL SHEETS FOR PURPOSE OF GALVANIZING OR OTHERWISE COATING THEM.

No. 580,210. Patented Apr. 6, 1897.

Witnesses:

Inventors:
Edward A. Davies
Stephen T. Thomas
by Henry Connett
their Attorney (No Model.) 5 Sheets—Sheet 3.

E. A. DAVIES & S. T. THOMAS.
APPARATUS FOR PREPARING METAL SHEETS FOR PURPOSE OF GALVANIZING OR OTHERWISE COATING THEM.

No. 580,210. Patented Apr. 6, 1897.

Witnesses:
J. W. Wiman
Peter A. Ross

Inventors:
Edward A. Davies
Stephen T. Thomas
by Henry Connett
their Attorney (No Model.) 5 Sheets—Sheet 4.

E. A. DAVIES & S. T. THOMAS.
APPARATUS FOR PREPARING METAL SHEETS FOR PURPOSE OF GALVANIZING OR OTHERWISE COATING THEM.

No. 580,210. Patented Apr. 6, 1897.

WITNESSES:
J. H. Himan
Peter A. Ross.

INVENTORS:
Edward A. Davies
Stephen T. Thomas
By Henry Connett
Attorney.

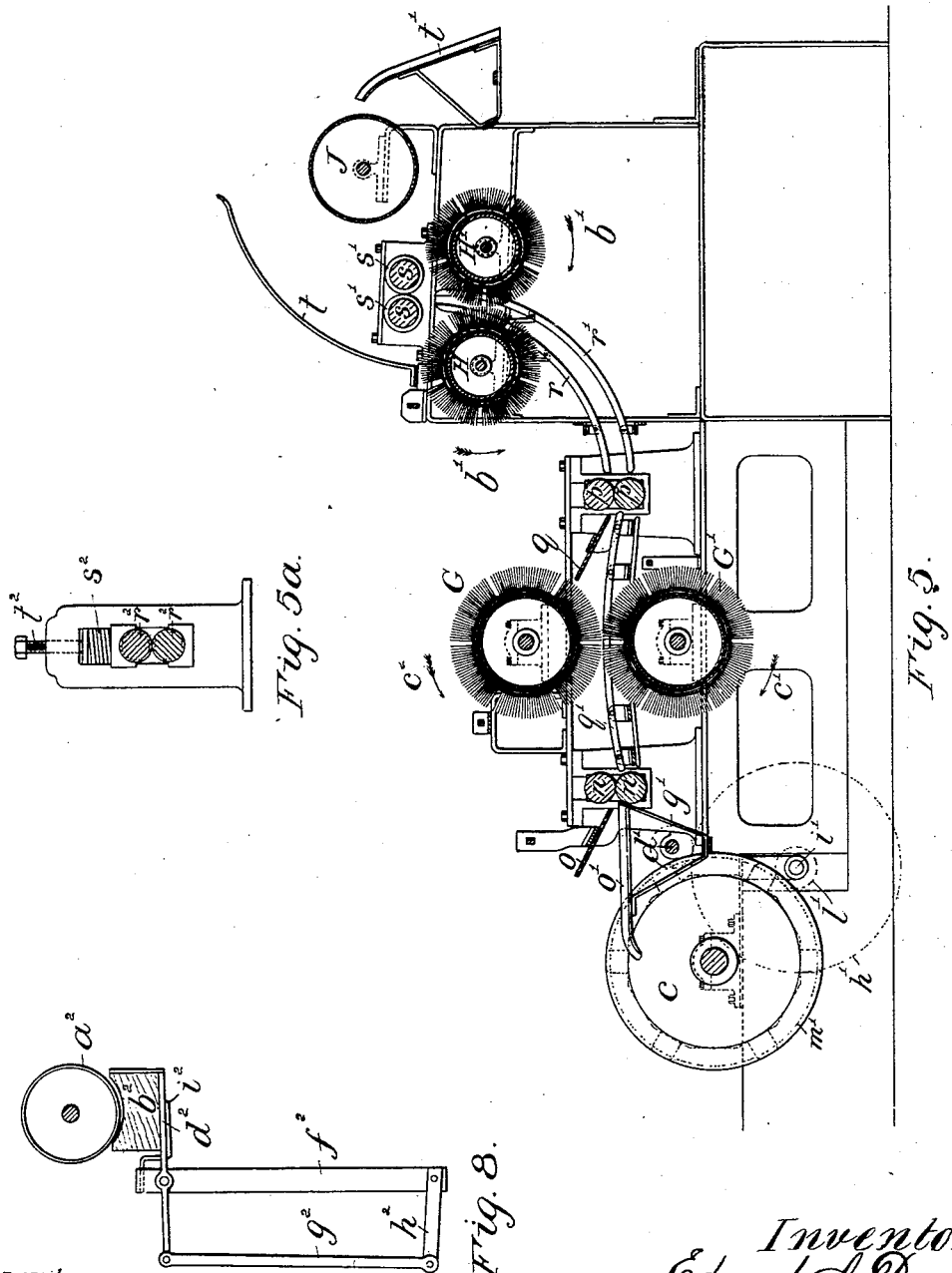

United States Patent Office.

EDWARD ALBERT DAVIES AND STEPHEN T. THOMAS, OF WOLVERHAMPTON, ENGLAND, ASSIGNORS TO DAVIES BROTHERS & CO., LIMITED, OF SAME PLACE.

APPARATUS FOR PREPARING METAL SHEETS FOR PURPOSE OF GALVANIZING OR OTHERWISE COATING THEM.

SPECIFICATION forming part of Letters Patent No. 580,210, dated April 6, 1897.

Application filed July 3, 1896. Serial No. 597,971. (No model.)

*To all whom it may concern:*

Be it known that we, EDWARD ALBERT DAVIES and STEPHEN THORPE THOMAS, subjects of the Queen of Great Britain, residing at Wolverhampton, in the county of Stafford, England, have invented certain new and useful Improvements in Apparatus for Preparing Metal Sheets for the Purpose of Galvanizing them or otherwise Coating them with Metal or Metallic Alloy; and we do hereby declare that the following is a full, clear, and exact description of the invention, which will enable others skilled in the art to which it appertains to make and use the same.

This invention relates to the removal of scale from metal sheets as a preliminary to galvanizing them, and has for its object an apparatus especially adapted for performing the work in a continuous, thorough, and inexpensive manner.

In general the apparatus comprises a suitable furnace for heating the plates or sheets in order to raise the scale thereon, and an endless-chain carrier which keeps the metal sheets moving continuously through the furnace, they being placed on the carrier at one end thereof, then carried through the furnace, and finally delivered to a pair of receiving or feeding-in rolls. These rolls drive the sheet forward between two oppositely-placed rotating metallic scouring brushes or devices and onto a pair of withdrawing-rolls. These latter drive the sheet between another and similar pair of scouring brushes or devices and to a final pair of withdrawing-rolls. The metallic scouring devices, operating simultaneously on opposite sides of the metal sheet at the same point, exert a powerful scouring action and thoroughly remove the scale, thus preparing it for the final pickling operation.

In order that the invention may be clearly understood, we will proceed to describe the same with reference to the accompanying drawings, which illustrate an embodiment of the same.

Figure 2:
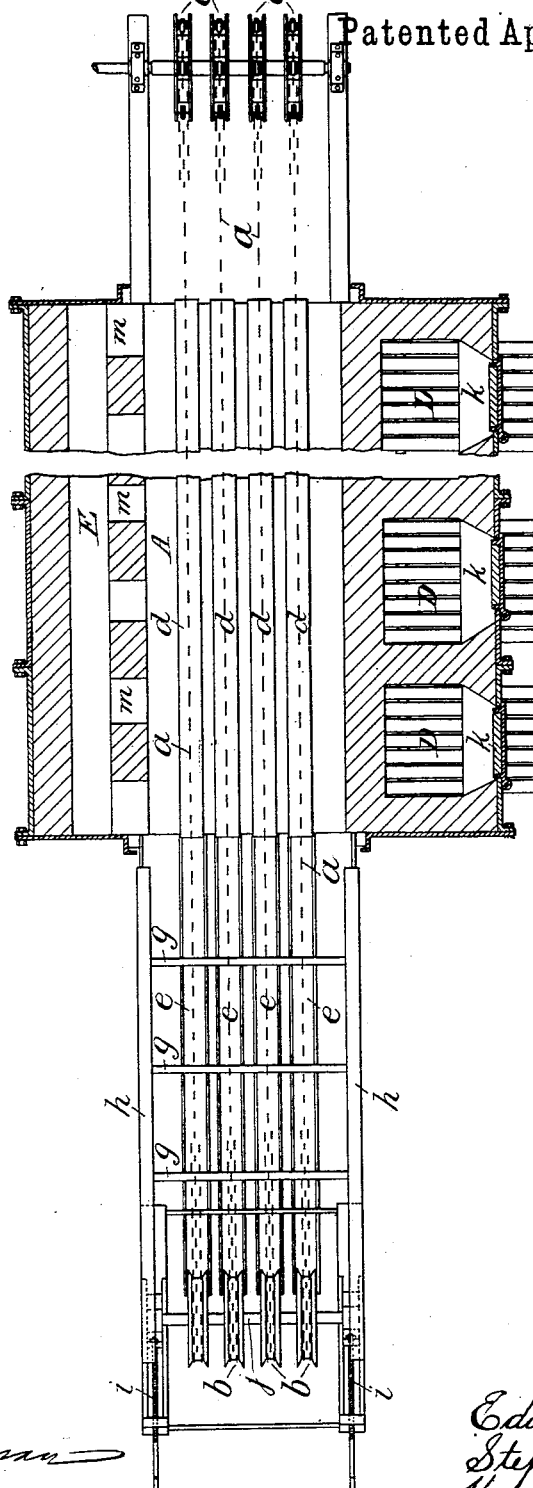
Figure 5:
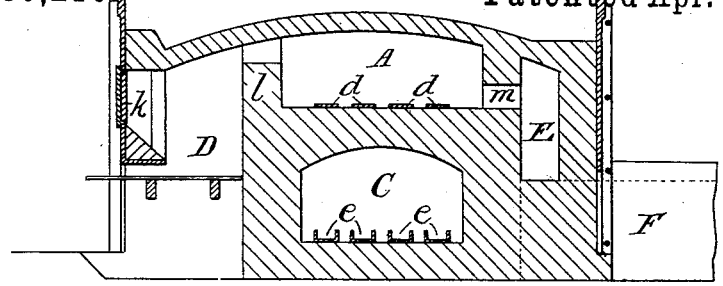
Figure 6:
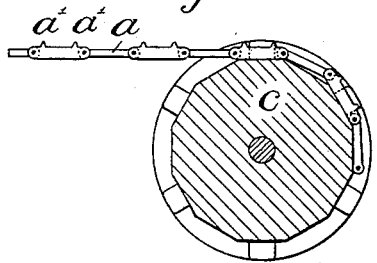
Figure 7:
Figure 9:
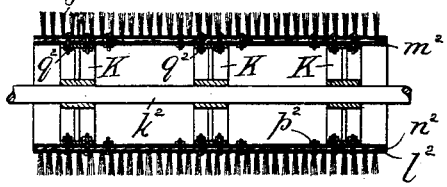
Figure 11:
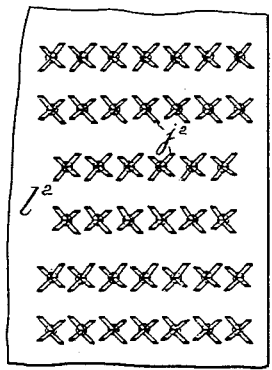
Figure 10:
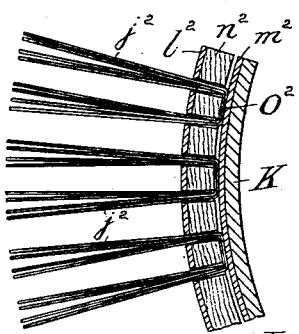
Figure 4:
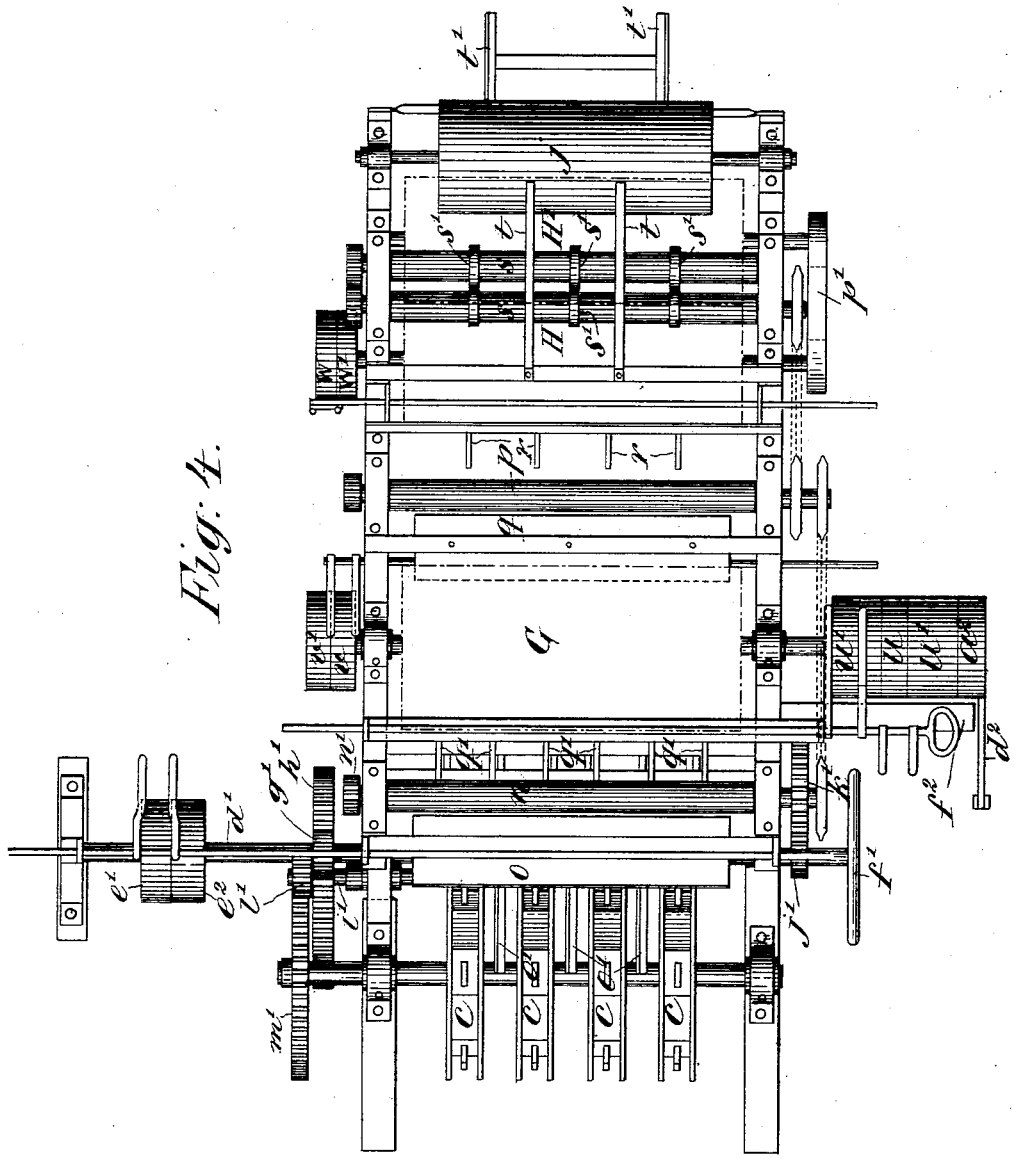

Figure 1 is a longitudinal section through the furnace used for scaling the sheets and shows also the appliances by means of which the sheets are carried automatically into, through, and out from the furnace. Fig. 2 is a sectional plan of the furnace and shows also in plan view the appliances for carrying the sheets into, through, and out from the furnace. Fig. 3 is a transverse section through the furnace, taken on line $xx$ of Fig. 1. Fig. 4 is a plan, to an enlarged scale, of apparatus by which the metallic scale which has been raised in the furnace is removed from the surfaces of the sheets and by which such surfaces are thoroughly scoured and brushed and shows also a portion of the apparatus by which the sheets are carried through the furnace. Fig. 5 is a vertical longitudinal section taken through the middle of the apparatus shown by Fig. 4. Fig. 5$^a$ is a vertical section taken through a pair of rolls which may be used in lieu of the first pair of scouring-brushes hereinafter described. Fig. 6 shows a section, to an enlarged scale, of one of the sprocket-wheels for operating the carrier-chains and a side elevation of a portion of one of the chains. Fig. 7 is a plan of Fig. 6. Fig. 8 is a detached elevation of the brake arrangement hereinafter described. Fig. 9 is a longitudinal section through one of the scouring-brushes. Fig. 10 is a transverse section of a portion of one of such brushes, drawn to an enlarged scale. Fig. 11 is a front elevation of a portion of one of such brushes, the curved surface which bounds the outer ends of the wires or metallic bristles being shown for convenience as if spread out flat.

Referring first to Figs. 1, 2, and 3, the furnace illustrated by such views is formed with a heating-chamber A for the sheets. This chamber is of a width to suit the maximum width of the sheets which are to be scaled therein and is of a length which is considerable compared with its width, being conveniently about thirty to thirty-five feet in length between the doors. Each end of the chamber A is normally closed by means of a door B, capable of being raised in vertical guides in the usual manner of raising similar doors, so as to completely open the ends. These doors, however, when closed do not completely close the ends of the chamber A, but leave a space at each end between the floor of the chamber A and the lower edge of the corresponding door, through which the sheets are carried. The doors B do not appear in Fig. 2, as the section of such view is taken at a level immediately below the bottoms of the doors. Endless chains $a$ pass around wheels $b$, which are in position some distance from the feeding-in end of the furnace, and around sprocket-wheels $c$, which are in position a short distance beyond the delivery end of the furnace, and these chains pass through the chamber A of the furnace and run upon plates $d$ upon the bottom of the chamber. The under sides of the chains run along metal channels $e$, which pass also through a hollow space C, formed underneath the chamber A of the furnace. The spindle carrying the sprocket-wheels $c$ is driven continuously from any suitable source of power, and the links of the chains are caused to move constantly through the chamber A in the direction of the arrow $f$, Fig. 1.

Each pair of side links of the endless chains $a$ are formed with projections $a'$, (see Figs. 6 and 7,) upon which the sheets are placed for being carried into and through the chamber A by the movement of the endless chains. The portions of the endless chains $a$ which are at any time passing from the wheels $b$ toward the furnace are carried by rollers $g$, which are capable of revolving in bearings supported by longitudinal bearers $h$. The chains may be tightened up from time to time, as the joints thereof wear, by screw tightening devices $i$, which draw back along guides on their supporting-bed, the bearings which support the spindle $j$ carrying the wheels $b$.

Furnace-grates D are arranged along one side of the heating-chamber A and are provided with suitable firing-doors $k$. The products of combustion from the furnace-grates D pass over the top of a wall $l$, which divides them from the heating-chamber A, and thence into the heating-chamber, and pass away from such chamber through flues $m$ at the bottom of the wall on the opposite side of such chamber, and thence into a flue E, running along the side of the chamber, and from thence through a flue F to the chimney.

The chains are caused to move, preferably, at the rate of about from nine to eighteen feet per minute, according to the thickness of the sheets under treatment, the slower rate being suitable for sheets of fourteen Birmingham wire-gage and thereabout and the quicker rate for sheets of twenty-six Birmingham wire-gage and thereabout. Thus every portion of a sheet is exposed to the heat of the chamber for from about three minutes twenty seconds to about one minute forty seconds. The chamber is maintained at a temperature which causes the sheets to be heated to a bright red heat, and the scale is thus raised on the surfaces of the sheets in a manner which adapts it to be removed by a scouring force.

The doors B are normally down while the sheets are being carried into, through, and out from the heating-chamber A, and are required only for obtaining access to the interior of the chamber for the purpose of repairs or in case of a sheet getting out of place during its passage therethrough.

Referring now to Figs. 4 and 5, $c$ are the sprocket-wheels. (Shown also by Figs. 1 and 2.) $n\ n$ are a pair of rolls which receive the sheets as they pass from the heating-chamber A. The sheets are automatically fed to the rolls by the operation of the endless chains and are guided thereto between upper and lower guides $o\ o'$. G G' are upper and lower rotating scouring-brushes having metallic bristles, between which the sheets are passed as they are fed onward by the rolls $n\ n$, the sheets being guided thereto along the upper surfaces of curved guides $q'$. As the forward ends of the sheets pass onward from the brushes G G' they are caught between withdrawing-rolls $p\ p$, to which they are guided between the guides $q'$ and an upper guide $q$. The sheets are carried forward by the rolls $p\ p$ between the curved guides $r\ r'$ and between a second pair of metallic scouring-brushes H H', and thence between withdrawing-rolls $s\ s$, formed, preferably, with collars $s'$, which alone bear against the surfaces of the sheets. The brushes are indicated by broken lines in Fig. 4 for convenience of illustration.

As the sheets pass from the rolls $s\ s$ they are deflected by curved guides $t$ and fall over a drum or barrel J down the inclined guides $t'$ onto a truck, by means of which they are conveyed to the pickling-tank. The sheets are then pickled and subsequently galvanized or otherwise coated with metal or metallic alloy by immersion in the usual manner in a bath of the molten metal or metallic alloy.

The sprocket-wheels $c$ and the rolls and brushes may be driven in any convenient manner, but so that the brushes H H' revolve continuously in the directions, respectively, indicated by the arrows $b'$, and so that the brush G' revolves continuously in the direction of the arrow $c'$ and the brush G revolves in the direction of the arrow $c^2$ while a sheet is passing between the brushes G G' previously to its forward end being caught between the rolls $p\ p$, and so that the brush G revolves in the opposite direction after the forward end of the sheet has been caught between the rolls $p\ p$ and before the hinder end of the sheet has left the rolls $n\ n$ and continues to revolve in such direction during the further operation of these brushes upon the surfaces of the same sheet. It is preferred to reverse the direction of revolution of the brush G as soon as possible after the forward end of a sheet has been caught between the rolls $p\ p$, as the scouring effect of the brush is better when rubbing backward on the surface of the sheet than when rubbing forward. Both pairs of scouring-brushes should be driven at about one hundred revolutions per minute.

According to a convenient method of driving the scouring and brushing apparatus a spindle $d'$, carrying fast and loose pulleys $e'\,e^2$ to receive the driving-belt, is driven from a pulley on an overhead shaft. This spindle extends across the width of the apparatus and has a hand-wheel $f'$ fixed on the opposite end to that on which the pulleys $e'\,e^2$ are carried, in order that it may be turned by hand to reverse a sheet which may be entered skewwise or in a puckered condition. A pinion $g'$ on the spindle $d'$ gears into a wheel $h'$ on a short spindle $i'$, and a pinion $j'$ on the spindle $d'$ gears into a wheel $k'$ on the spindle of the top roll $n$. A pinion $l'$ on the spindle $i'$ gears into a wheel $m'$ on the spindle which carries the sprocket-wheels $c$. The rolls $n$ are geared together by equal spur-pinions, one of which $n'$ only is shown fixed on their spindles. The rolls $p$ are similarly geared together and are driven from the spindle of the top roll $n$ by chain-gear. The rolls $s$ are also similarly geared together and are driven by chain-gear from the spindle of the top roll $p$. The brush G is driven independently from an overhead shaft through the medium of a straight and crossed belt and a pulley $u$, fixed on its spindle, on each side of which is a loose pulley $u'$, and the spindle of the brush G′ carries fast and loose pulleys $v\,v'$, which are driven by a belt from an overhead shaft. The brushes H H′ are connected for driving by a belt $p'$ and are driven by a belt from an overhead shaft which may be engaged, alternatively, with a fixed pulley $w$ on the spindle of the brush H or with a loose pulley $w'$ on such spindle. Suitable belt-guides, all capable of being operated from the same side of the apparatus, are provided for moving any belt from a fixed pulley onto an adjacent loose pulley, and vice versa.

The drum or barrel J is not driven by mechanism for such purpose, but is free to be revolved by the movement of the sheets as they pass over it.

It may be explained that the purpose in revolving the brush G in the direction of the arrow $c^2$ until the forward end of a sheet has been caught by the rolls $p$ and subsequently in the opposite direction is to prevent either end of a sheet becoming puckered or bent while passing between the rolls $n$ and the rolls $p$. The reversal of the rotation of the brush is effected by the attendant moving the strap guide of the belts which alternatively drive the fixed pulley $u$.

In order to facilitate the rapid reversal of the direction of revolution of the brush G, a brake-drum $a^2$ (see Figs. 4 and 8) is fixed on the spindle of the brush, and a brake-block is pressed thereagainst immediately the belt which has just been driving the brush is moved from off the fixed pulley $u$. The block $b^2$ is carried on the inner end of a lever $d^2$, which is fulcrumed to a support $f^2$. The outer end of the lever $d^2$ is connected by a rod $g^2$ with a treadle-lever $h^2$, and thus as the treadle-lever is depressed the block $b^2$ is pressed against the pulley $a^2$. The lever $d^2$ may rest when the block is clear of the pulley upon an arm $i^2$, which projects from the support $f^2$. If desired, the brush G′ may also be reversed for the same purpose as the brush G and by the same or similar means.

Referring now to Figs. 9, 10, and 11, the core of the brush consists of three plain pulleys K, keyed onto the spindle $k^2$. The sole or base to which the wires or metallic bristles are fixed is made up of a number of segments, each of which consists of an outer plate $l^2$ and an inner plate $m^2$, with a thickness of wood $n^2$ between. The wires are formed of steel, preferably of flat section, of, say, one-sixteenth of an inch wide by about twenty-six Birmingham wire-gage in thickness, and are bent flatwise, each with a portion $o^2$, which passes in a circumferential direction along the back of the wood $n^2$, and with portions $j^2$, which pass through holes formed in the wood and in the outer plate $l^2$ and project beyond the outer face of such plate, as shown. Four of these bent wires are put through two holes formed the required distance apart through the wood $n^2$ and outer plate $l^2$, and thus four metallic bristles project from each of such holes. The sets of wires are placed in position in relation to one another in the manner sufficiently indicated by Fig. 11.

The inner plate $m^2$ is fixed to the wood $n^2$ and to the outer plate by means of bolts $p^2$, as shown by Fig. 9, after the wires have been put through their respective holes, and the segments are then bolted to the pulleys K by means of bolts $q^2$, as shown by such figure. A portion of the rim only of one of the pulleys K is shown by Fig. 10. The wood $n^2$ may be soaked in tungstate of soda as a protection against the heat of the sheets, or a layer of asbestos may be interposed between the outer face of the wood and the outer plate $l^2$, but neither of these precautions is essential. The entire circumference of the sole which carries the metallic bristles of a brush may conveniently be made up of six segments in the case of the brushes G G′ and of five segments in the case of the smaller brushes H H′, as shown in Fig. 5; but any number of segments may be used for a brush as may be found most convenient.

In lieu of the scouring-brushes G G′ a pair of rolls $r^2$, Fig. 5$^a$, may be employed, through which the sheets pass on their passage from the feeding-in rolls $n$ to the withdrawing-rolls $p$. The upper roll is pressed down upon the upper surface of a sheet by spiral springs, such as the spring $s^2$, the tension of which is adjusted by screws, such as $t^2$. These rolls are operated in the manner of the brushes G G′, and by their rapid rotation compared with the speed of rotation of the rolls $n$ and $p$ tend to thoroughly scour off the scale from the surfaces of the sheets.

By the use of this apparatus the sheets are thoroughly freed from scale and scoured, whereby the minimum quantity of acid for pickling is required, and the work is done with a less expenditure for labor than by other methods and means with which we are familiar.

Having fully described our invention, what we claim, and desire to secure by Letters Patent, is—

1. In an apparatus for preparing metal sheets for the purpose of galvanizing them, or otherwise coating them with metal, the combination with a pair of rotating scouring devices, of the feeding-in rolls $n$, $n$, withdrawing-rolls, $p$, $p$, and means by which one of the pair of rotating scouring devices may be caused to operate in either direction of rotation at will, substantially as and for the purpose set forth.

2. In an apparatus for preparing metal sheets for the purpose of galvanizing them or otherwise coating them with metal, the combination with a scaling-furnace, of the rotating scouring devices, the feeding-in rolls $n$, $n$, the withdrawing-rolls $p$, $p$, and means by which either of the pair of rotating, scouring devices may be caused to operate alternately in opposite directions of rotation, substantially as described and for the purpose set forth.

In witness whereof we have hereunto signed our names in the presence of two subscribing witnesses.

EDWARD ALBERT DAVIES.
STEPHEN T. THOMAS.

Witnesses:
STEPHEN WATKINS,
ROBERT M. LISTER.